United States Patent
Federhen

(10) Patent No.: US 6,802,685 B1
(45) Date of Patent: Oct. 12, 2004

(54) DEVICE AND METHOD FOR INWARDLY TRANSFERRING BULK MATERIAL INTO A PNEUMATIC CONVEYOR LINE

(76) Inventor: Bernd Federhen, Zeppelinstrasse 12, 57078 Siegen (DE)

( * ) Notice: Subject to any disclaimer, the term of this patent is extended or adjusted under 35 U.S.C. 154(b) by 0 days.

(21) Appl. No.: 09/914,057
(22) PCT Filed: Feb. 15, 2000
(86) PCT No.: PCT/EP00/01212
§ 371 (c)(1), (2), (4) Date: Dec. 26, 2001
(87) PCT Pub. No.: WO00/50324
PCT Pub. Date: Aug. 31, 2000

(30) Foreign Application Priority Data

Feb. 23, 1999 (DE) .......................................... 199 07 690

(51) Int. Cl.⁷ ................................................ B65G 1/00
(52) U.S. Cl. ...................... 414/292; 222/442; 406/132
(58) Field of Search ................................ 406/145, 132; 414/291, 292; 222/442

(56) References Cited

U.S. PATENT DOCUMENTS

| | | | | |
|---|---|---|---|---|
| 2,032,367 A | * | 3/1936 | Kennedy et al. .............. | 406/25 |
| 3,094,249 A | * | 6/1963 | Pullen ......................... | 406/132 |
| 3,881,610 A | * | 5/1975 | Hessling ..................... | 414/289 |
| 4,182,591 A | * | 1/1980 | Stanelle ....................... | 414/291 |
| 4,674,922 A | * | 6/1987 | Federhen et al. ........... | 406/126 |
| 4,850,751 A | * | 7/1989 | Federhen et al. ........... | 406/127 |
| 6,595,735 B1 | * | 7/2003 | Lee ............................. | 414/292 |

* cited by examiner

Primary Examiner—Joe Dillon, Jr.
(74) Attorney, Agent, or Firm—Bachman & LaPointe, P.C.

(57) ABSTRACT

In a device for transferring bulk material from a reservoir or a holding space through a lock space into a pneumatic conveyor line—in which the lock space can be closed in relation to the reservoir or holding space by an axially movable closure body and at least one counterpart sealing element disposed in opposite relationship in its path of movement—the closure body has at least one vent opening which opens into an air discharge passage and can be closed in the upward closing movement of a stroke element with the sealing body; the downward opening travel (x) thereof is shorter than the downward travel of the stroke element with the sealing body. The closure body enlarges from a narrow cross-section—forming an inner sealing edge in a funnel-like configuration towards the sealing body and the narrow cross-section is an annular seat for the sealing body in the closure position. One of the counterpart sealing elements is a flexible sealing surface which is gripped in respect of cross-section at one end and the other is a sealing edge which entrains the free edge region thereof and which increasingly deforms it in the path of movement; the sealing surface is preferably in the form of a ring surrounding the closure body.

21 Claims, 4 Drawing Sheets

Figure 1:
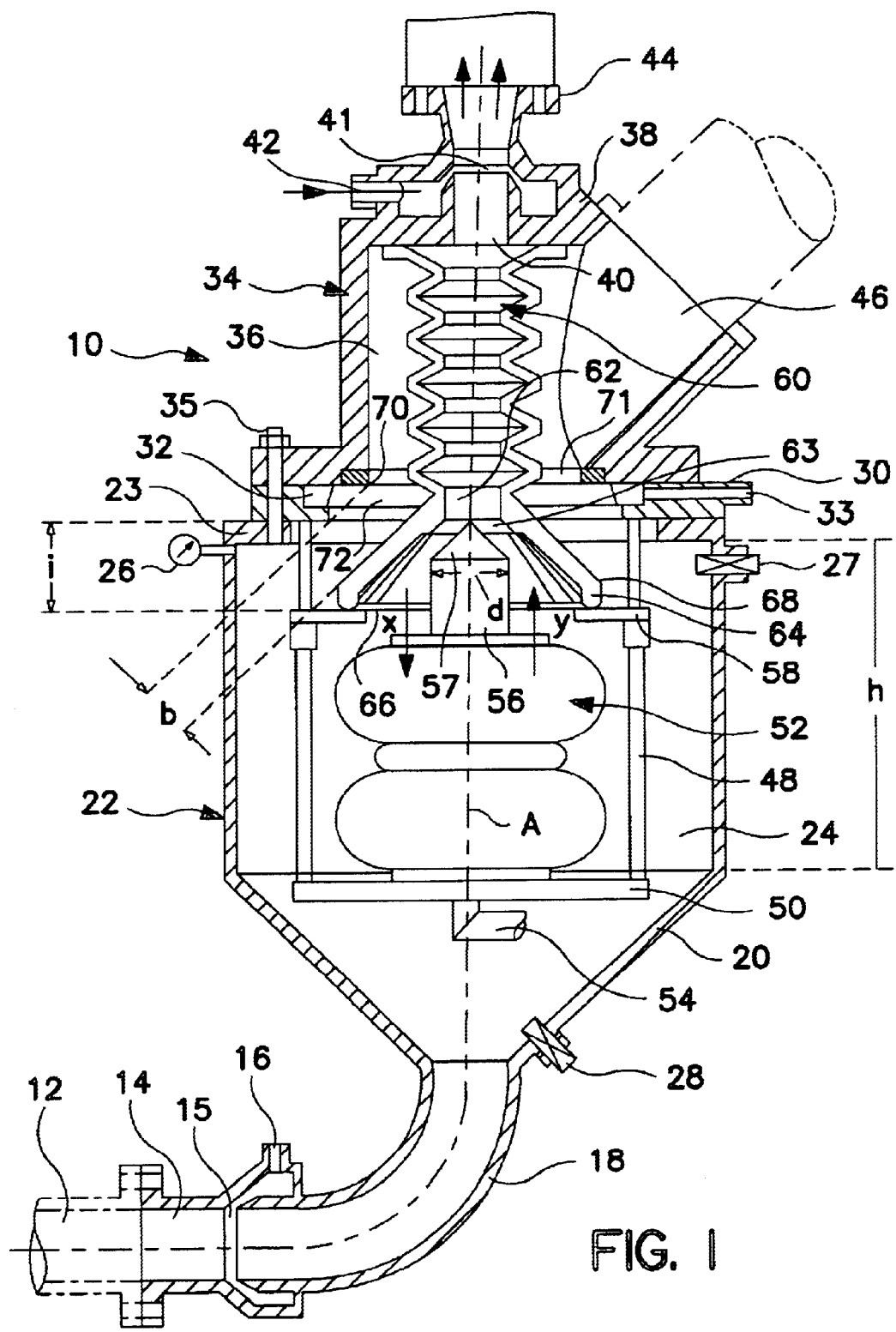

DEVICE AND METHOD FOR INWARDLY TRANSFERRING BULK MATERIAL INTO A PNEUMATIC CONVEYOR LINE

The invention concerns a device and a method of transferring bulk material from a reservoir or a holding space through a lock space into a pneumatic conveyor line, wherein the lock space is closable in relation to the reservoir or holding space by a movable closure body and at least one counterpart sealing element in opposite relationship thereto in its path of movement.

Devices of that kind are to be found in EP 0 166 959 B1; at its intake side it has a conical closure body, in the center of which a vent opening surrounded by a resilient collar is cyclically closed and opened by a stepped cone of elastic material. The seal which is disposed in opposite relationship to the closure body is to be deformed by the conveyor air which is supplied thereto—through an annular passage disposed therebeneath—in such a way that the conveyor air issues uniformly directed on to the closure body and thus in the closure movement blows the closure body—seal contact line free of product. That is intended to ensure a pressure-tight sealing action for the inner lock space towards the supply reservoir. Release of the compressed air at the end of the conveyor cycle is effected directly by the now open central opening in the closure cone into the supply reservoir which is disposed thereabove and which is filled with the product to be transported. The air has to flow through the pores of the product.

It has been found that the distribution of air through the deformable seal is not so uniform that the closure body always closes against the sealing edge of the seal in pressure-tight relationship. In addition with strain gauge measurements made on the walls of the reservoir it was established that the discharge air which flows through the pores in the product, when the reservoirs are of considerable height—for example in silos—builds up pressures which make it necessary for those containers to be of a relatively great wall thickness, which thus involves higher cost levels.

That deficiency was overcome by the invention described in EP 0 270 012 B1, insofar as the air released from the lock space is passed through a tube portion at the closure cone with an opening arranged above the flow path of the bulk material, into an intake housing, and is discharged through a central opening in the intake housing. When the pressure in the lock space has fallen, the closure cone moves downwardly and the opening in the tube portion is closed in that position of the closure cone by a resilient cone tip. The opening is only open in the air release procedure; both in the conveyor mode of the apparatus and also when the bulk material is passing into the lock space, the opening is closed by the resilient cone tip. Therefore the air which is displaced by the bulk material as it flows into the lock space must be passed in counter-flow relationship through the inwardly flowing bulk material. That increases the length of the period of time required to fill the lock space.

A not inconsiderable duration for the filling operation is also involved in the arrangement of EP 0 166 951 B1. In that case, provided beneath the closure element for the outlet of the lock space is a feed line for conveyor air. The major part of the conveyor air enters here, at relatively high flow speed, due to the small cross-section involved. There is a pressure drop in the discharge housing, due to the flow being accelerated in the cross-section of the mouth opening. In a condition of co-operation with the product-air mixture which subsequently flows out of the lock space and which is discharged through the conveyor conduit, that produces an upward and downward movement of the discharge flap. As a result, the switch actuated by the discharge flap initiates vent operations before the lock container is completely emptied. Wear occurs in the discharge air lines and there is a loss in conveyor capacity due to the fact that the bulk material does not entirely discharge from the lock space. If the air feed is arranged about 3 meters downstream on the conveyor line, the described effect is eliminated, as can be seen from EP 0 270 012 B1. As in that case however the transport of product from the discharge housing to that air feed-in location only has to be overcome by the amount of air added at the closure head at the intake end, the conveyor capacity is reduced.

The conveyor capacity to be achieved depends on the duration of the cycle time. The cycle time is primarily composed of the emptying time and the filling time of the lock space. The emptying time is substantially dependent on the properties of the bulk material, the conveyor path, the conveyor cross-section, the conveyor air speed and the conveyor pressure. The filling time of the lock space is in turn substantially determined by the properties of the bulk material, the feed flow cross-section, the open cross-section of the closure head and the flow conditions in the opened closure head when the bulk material is flowing into the lock space. It has been found that the introduction of bulk material takes place reliably and quickly only with relatively grainy and heavy bulk materials, for example quartz sand and sugar in crystal form. In the case of light bulk materials in dust form the introduction thereof is uncertain and the introduction time is very long so that these devices do not achieve adequate conveyor capacities.

The device disclosed in EP 0 270 012 B1 also provides that light materials to be conveyed are fluidised in the intake housing by the air which rises in counter-flow relationship, and substantially fill the intake housing. Upon next venting of the lock space considerable amounts of the material to be conveyed are then discharged through the central opening of the intake housing. In practice those amounts of conveyor air in those apparatuses can be fixedly set by means of adjustable throttle valves; there is no regulation of the pressure and loading conditions of the conveyor flow. As a result it is not possible to make optimum use of the energy of the conveyor air which is introduced into the system. Sealing elements of elastic material are required in the known devices for permanently pressure-tightly closing off the lock space. The admissible temperature range is greatly restricted by the properties of those materials.

With knowledge of that state of the art the inventor set himself the aim of providing a simple device and a conveyor method for same, with which the levels of conveyor capacity can be increased and even light bulk materials in dust form can be transferred into a conveyor line. The invention further seeks to provide that the conveyor operation is more economical and even hot materials being conveyed can also be fed into a conveyor line.

The teaching of the independent claim provides for attainment of that object; the appendant claims set forth advantageous developments. The scope of the invention also embraces all combinations of at least two of the features disclosed in the description, the drawing and/or the claims.

In accordance with the invention the closure body has at least one vent opening which opens into an air discharge passage and is closable upon the upward closing movement of a stroke element with a sealing body; the downward opening movement thereof is also shorter than the downward movement of the stroke element with the sealing body. In that respect it has proven to be desirable for the closure body to be so designed that it enlarges from a narrow cross-section forming an inner sealing edge in a funnel-like configuration towards the sealing body and the narrow cross-section is an annular seat for the sealing body in the closure position.

In accordance with further features of the invention an air discharge passage is taken from the vent opening of the closure body to an aperture in an intake housing which is arranged upstream of the lock space, and the air discharge passage is connected to an air discharge line at the aperture in the operative condition. In addition the sealing body should be provided with a conical tip for the annular seat.

The closure body which is provided at the intake end in the lock space and which seals against a peripherally extending edge in the closure position therefore has at least one vent opening which opens into an air discharge passage and is closed in the upward closing movement with the sealing body.

By virtue of that arrangement the air which is displaced out of the lock space by the inflowing bulk material can leave the lock space through the vent opening of the closure body without retarding the inflowing bulk material. If in addition air is sucked away at the intake housing when the bulk material passes into the lock space, the discharge of air from the lock space is accelerated and thus the bulk material intake time is further reduced. Particularly for light bulk materials of fine grain size, it is advantageous for the vent opening in the closure body and the air outlet opening of the intake housing to be connected independently of travel. In accordance with the invention that can be effected for example by means of a concertina member or by hollow profile members which are guided telescopically one within the other. By virtue of those features discharge of the air takes place in the optimum fashion and the required bulk material intake time is very short. Those passages can easily be so designed that—as stated—the possible opening travel of the closure body is less than the opening travel of the stroke drive.

Fans but in particular injectors which can very advantageously be arranged in an air discharge passage are suitable for discharging the air. A suitable form of stroke drive is in particular—per se known—pneumatically actuated bellows-type cylinders and double-acting pneumatic cylinders whose upward and downward movement is produced by air acting alternately on the two piston surfaces, but also single-acting pneumatic cylinders with a plunger piston. In the arrangement with a plunger piston the closing movement is effected by means of compressed air, while the opening movement is produced either by the weight of the plunger piston and the closure body or by virtue of a reduced pressure being applied to the piston surface. The opened position is then achieved by a suction effect on the plunger piston.

It is possible to combine with that device arrangements—for example pins and guides—which rotate the closure body somewhat about its axis in its upward/downward movement. In that way the contact surfaces of the closure body and the peripherally extending sealing edge are permanently smoothed, kept groove-free and permanently remain sufficiently capable of affording sealing integrity, even if the closure body and the peripherally extending sealing edge comprise tough material, for example steel. That affords a design configuration of the device according to the invention even for hot bulk materials. If the seal which forms the peripherally extending sealing edge comprises elastic material, it can be so designed that the closing movement of the closure body is at least in part converted into a reinforcement of the sealing action. By virtue of that design configuration it is possible to produce markedly simpler devices—in particular for introducing substances in granule form into pneumatic conveyor lines—than is possible with the devices in accordance with the state of the art.

As is known, the feed of conveyor air can be effected on the one hand into the lock space through an air curtain which is directed on to the closure body and on the other hand, as viewed in the flow direction, downstream of the discharge cross-section of the lock space. If a valve is also present at the lock space outlet cross-section, then in accordance with the invention an air curtain can also be directed here on to the sealing edges of the valve for the purposes of cleaning those sealing edges. That is particularly advantageous when that valve is of a tough nature.

In accordance with the invention the feed of the conveyor air downstream of the valve should be implemented over a large area. In that way fluctuations in pressure emanating from the fed-in conveyor air in that region are avoided. In accordance with the state of the art, the two air flows can be set by means of throttle valves or aperture devices. It is however more advantageous, in accordance with the invention, to control the two air flows in accordance with the fluctuating pressure in the lock space or at the beginning of the conveyor line; in that way it is possible to make optimum use of the energy of the supplied compressed air.

Until a preselected conveyor pressure is reached, compressed air is primarily fed to the lock space, then to the air feed-in location which is downstream of the lock space, until the conveyor pressure has fallen below the preselected conveyor pressure. That provides that the ratio of the amount of material being conveyed to the amount of conveyor air is always kept almost at the optimum, while for a proportionate air flow the air feed-in locations can be connected by passages.

Particularly when dealing with materials to be conveyed which have a poor capacity for resistance to air, it is advantageous to couple an air in-feed at the beginning of the conveyor pipe, to the air in-feed at the valve which is connected downstream of the lock space. It is also possible to use a plurality of air feed-in locations along the conveyor line, which are controlled from the device according to the invention. Switching of the air in-feed can be effected pneumatically or electropneumatically.

It is also in accordance with the invention, in a device as set forth in the opening part of this specification for introducing bulk material from a reservoir or a holding space through a lock space into a pneumatic conveyor line—in which the lock space is closable in relation to the reservoir or holding space by an axially movable closure body and at least one counterpart sealing element disposed in opposite relationship thereto in its path of movement—for one of the counterpart sealing elements to be in the form of a flexible sealing surface which is clamped in cross-section at one end and for the other to be in the form of a sealing edge which entrains the free edge region of the sealing surface and increasingly deforms it in the path of movement; that sealing surface should preferably be a ring surrounding the closure body. Protection is claimed separately in respect thereof, and in respect of a design configuration in which the sealing surface is a sealing lip which is clamped in cross-section at one end on the housing side and the closure body is provided with at least one projecting sealing edge and with at least one entrainment portion which engages under the sealing lip. That thus affords an extremely efficient and simple sealing region.

The feature of inwardly deforming the lower edge region of the closure body which enlarges funnel-like in opposition to the stroke direction, forming the sealing edge and an inclined edge portion, makes it possible on the one hand easily to produce the required sealing edge and on the other hand to afford on the inclined edge portion the entrainment portions which then project therefrom.

In accordance with another feature of the invention the thickness of the sealing lip is greater than the spacing of the entrainment portion or portions from the sealing edge so that same can engage into the lip edge after the edge region has been lifted by the entrainment portions.

In another embodiment the deformable seal is part of the closure body and its lip edge is directed towards the edge of a stationary opening in the device.

At any event it has proven to be desirable for the sealing lip to be clamped at one end between two flanges. In addition the sealing lip is to be inclined downwardly in cross-section at an angle from its clamping location so that its lip edge faces in opposite relationship to the stroke direction. The latter moreover in the relieved position of the sealing lip is to extend substantially parallel to the stroke travel or the longitudinal axis of the device.

The method according to the invention is distinguished in that air displaced from the lock space during the inward transfer of the bulk material is discharged through at least one vent opening in the closure body, which goes into an air discharge passage. The displaced air can also be sucked out of the lock space. It has proven to be advantageous for the conveyor air to be fed to the described device at at least two feed-in locations and for those feed-in locations to be controlled alternately in dependence on a predetermined reference value of the conveyor pressure and an instantaneous actual value of the conveyor pressure.

Figure 2:
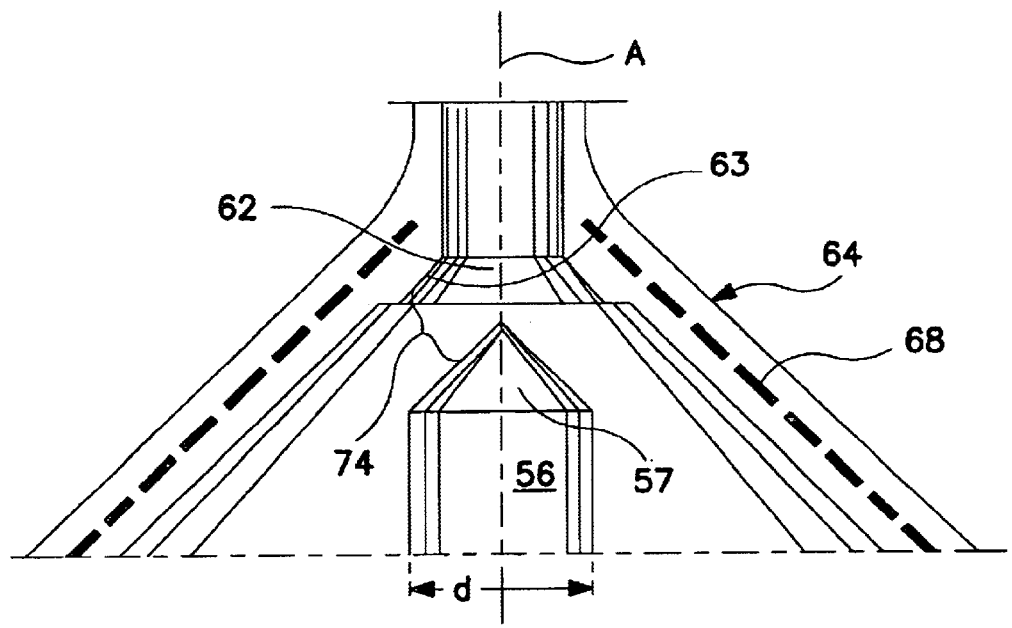
Figure 5:
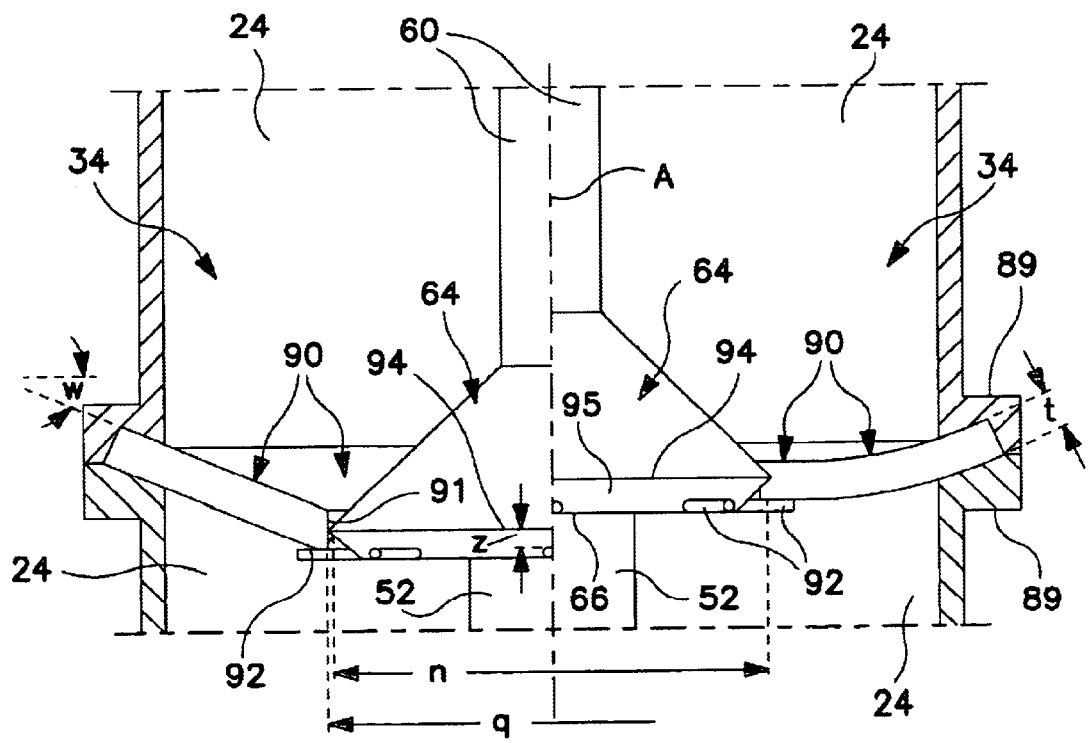
Figure 3:
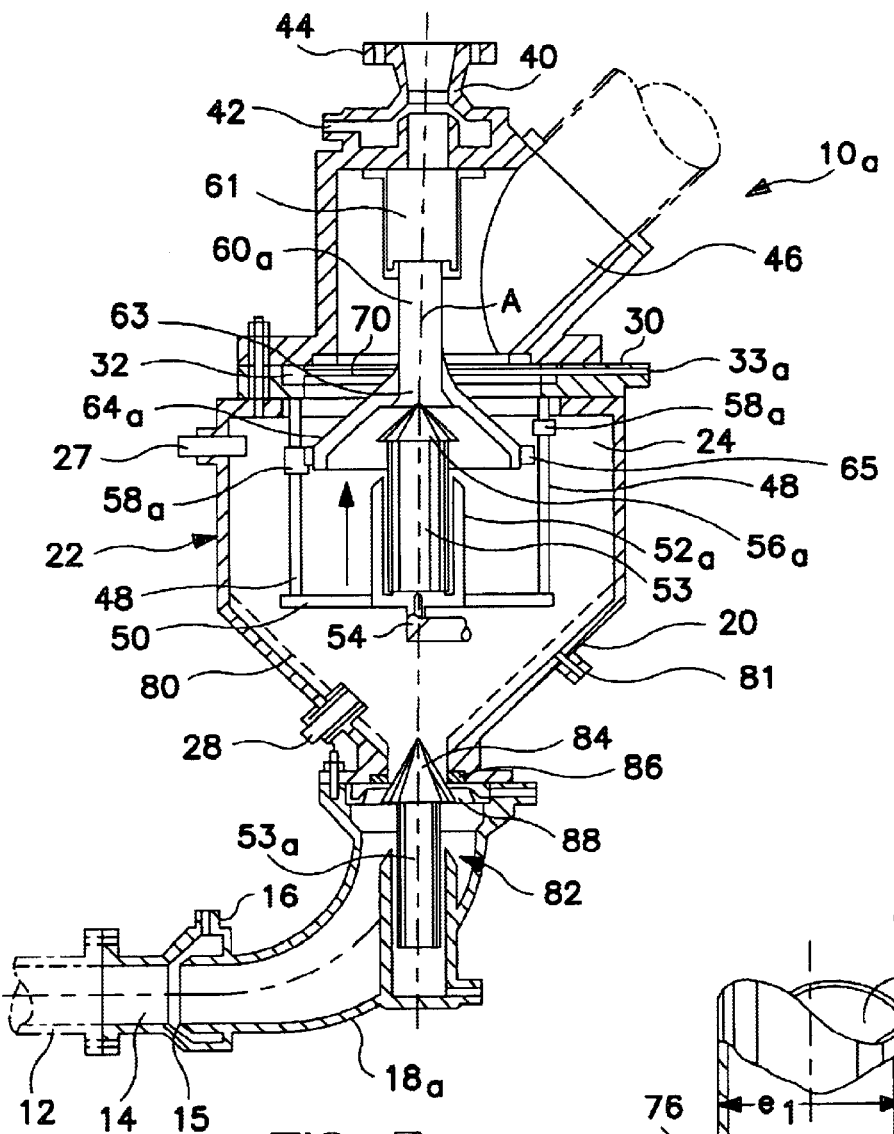
Figure 4:
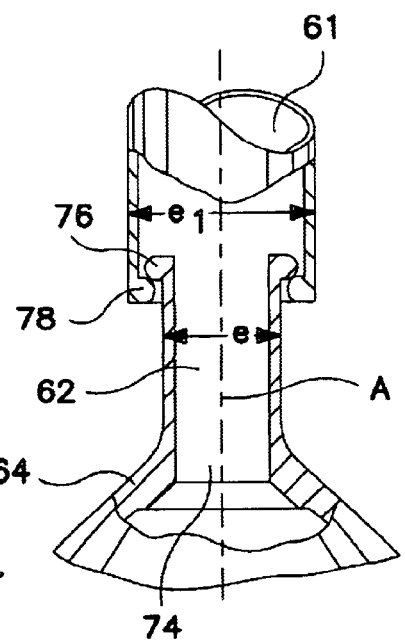
Figure 6:
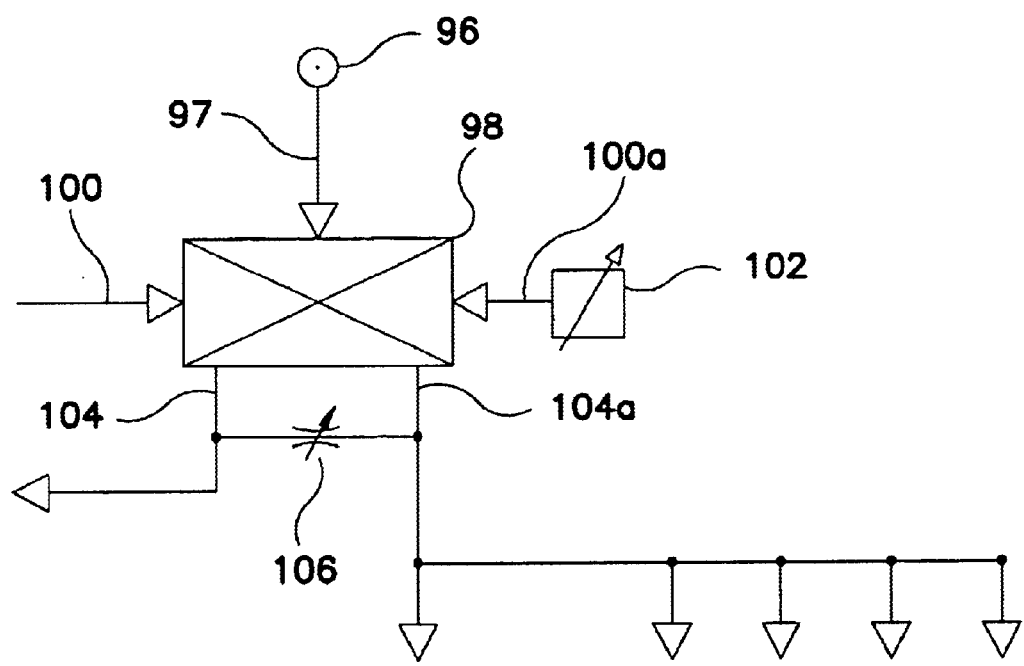

Further advantages, features and details of the invention will be apparent from the description hereinafter of preferred embodiments and with reference to the drawing in which:

FIG. 1 is a view in longitudinal section through a device for transferring bulk material into a pneumatic conveyor line in the intake position, FIG. 2 shows a part from FIG. 1 on an enlarged scale, FIG. 3 is a view corresponding to FIG. 1 of another embodiment of the device which is particularly suitable for hot bulk materials, FIG. 4 shows a part of FIG. 3 on an enlarged scale, FIG. 5 shows a view on an enlarged scale in comparison with FIG. 1 of a detail of an embodiment of a sealing system on a device for conveying substances in granule form, in two half-sections of mutually different operating positions, and FIG. 6 shows a control diagram relating to the feed of conveyor air into the device.

A device 10 for the transfer of bulk material (not shown in the drawing) into a pneumatic conveyor line 12 has, by way of a connecting bend 18 ending at a flange portion 14 with an annular gap nozzle 15 together with a compressed air connection 16, a base portion 20 of a lock housing 22, the base portion 20 tapering conically towards the connecting bend 18. The lock housing 22 encloses a cylindrical lock space 24 of an internal height h, at the upper end of which on the one hand there is provided a pressure measuring device 26, and on the other hand a maximum level probe 27 extends thereinto; an empty probe is indicated at 28 in the base portion 20.

Resting on an upper annular flange 23 of the lock housing 22 is an annular flushing flange or housing cover 30 which at its inner annular edge is provided with a blowing device 32; a radial compressed air connection 33 extends therefrom.

A tower-like intake housing 34 is fixed on the housing cover 30 with screw bolts 35, the intake space 36 thereof, which forms a holding space, being bridged across by a top wall 38. The latter includes at a central aperture 40 an injector 41 with a compressed air feed line 42. The aperture 40 which is on the longitudinal axis A of the housing also passes through a connecting flange 44 which sticks up from the top wall 38, for an air discharge line (not shown). A feed pipe 46 which is inclined upwardly from the intake space 36 for the bulk material opens laterally into the intake space 36.

Bolt-like round bars 48 project from the housing cover 30 in parallel relationship with the axis into the lock space 24. At the other end, a carrier plate 50 which is arranged at the upper edge of the base portion 20, for a stroke element 52 which is variable in respect of height, is connected to the round bars 48; the stroke element 52 is for example in the form of a bellows-type cylinder into which opens an air connection 54 which can be seen beneath the carrier plate 50.

The bellows-type cylinder 52 axially carries a cylindrical sealing body 56 of a diameter d with an upwardly projecting cone tip 57. Supports 58 project radially on both sides thereof from the round bars 48—at a spacing i in relation to the housing cover 30.

An air discharge passage 60 in the form of a bellows member is fixed to the underside of the top wall 38—surrounding the central aperture 40 thereof. The bellows member goes downwardly at a cylindrical vent opening 62 with a conically enlarging annular seat 63 for the cone tip 57, into a closure or funnel-shaped body 64 which enlarges conically from the annular seat 63 and whose funnel edge 66 rests on the supports 58; they delimit the opening travel of the closure body 64 in the direction indicated by the arrow x.

Provided between a sealing edge 70 which can be seen at the top side of the housing cover 30 and which is provided by an insert ring 71 of the intake housing 34 and the closure body 64 is an outer annular intake cross-section 72 of a width b, through which the bulk material flows into the lock space 24.

In the lower position of the sealing body 56 as shown in FIG. 1, a vent gap 74 is formed between the sealing body 56 and the closure body 64 (see FIG. 2).

In the illustrated embodiment in FIGS. 1 and 2 the closure body 64 and the air discharge passage 60 are made in one piece with inserted reinforcing inserts 68 from wear-resistant elastic material. As a result the sealing edge 70 and the sealing body 56 can comprise hard material. The lock device 10 operates cyclically. In the illustrated filling phase the bulk material flows through the intake housing 34 and the intake cross-section 72 into the empty lock space 24. The air displaced by the bulk material is passed—assisted by the injector 41 fed by the compressed air feed line 42—in an intensified fashion, in opposite relationship to the direction indicated by the arrow x, through the vent gap 74 and the air discharge passage 60 to the air discharge line which can be connected to the connecting flange 44.

After the maximum level probe 27 responds or after the expiry of an adjustable filling time the bellows-type cylinder 52 is acted upon by compressed air, by way of the air connection 54. It lifts the sealing body 56 against its annular seat 63 on the closure body 64 and thus closes off the air discharge path. In its further stroke movement the bellows-type cylinder 52, by means of the sealing body 56, lifts the closure body 64 against the peripherally extending sealing edge 70 and thus closes off the way into the intake housing 34, for the conveyor air which is supplied at the same time through the blowing device 32. The conveyor pressure builds up in the lock space 24. The bulk material is fed to the annular gap nozzle 15 and conveyed away through the conveyor line 12, with the compressed air which is discharged at the nozzle 15 at the same time.

When the lock space 24 is empty that is detected by the empty probe 28. When the conveyor line 12 is finally free of bulk material, that is detected by the pressure measuring device 26, due to the pressure drop. One of the two signals is used to initiate the release of compressed air in the bellows-type cylinder 52.

The bellows-type cylinder 52 is reduced in length, and the vent gap 74 is formed at the sealing body 56, in relation to the annular seat 63 of the closure body 64. The residual pressure from the lock space 24 can escape to the air discharge conduit. After the reduction in pressure in the lock space 24 the closure body 64 drops on to the supports 58 and thereby again opens the intake cross-section 72. The vent cross-section 74 remains open and fresh bulk material can flow in. The air displaced by the bulk material in the lock space 24 is drawn off by the injector 41.

In the view of the enlarged portion shown in FIG. 2 it is possible to see in particular the open vent gap 74 which extends between the annular seat 63 of the closure body 64 and the cone tip 57 of the sealing body, through which the air displaced by the inflowing bulk material can flow away unimpededly.

The stroke element of the device $10_a$ shown in FIG. 3 is in the form of a pneumatic cylinder $52_a$ which is disposed coaxially in front of the funnel shaped or closure body $64_a$ and which has a plunger piston 53, being extended upwardly into the upwardly conical sealing $56_a$. For the upward movement of that plunger piston 53 compressed air is passed through the connection 54 into the pneumatic cylinder $52_a$, while for the downward movement a reduced pressure is applied to the connection 54. In its upward movement the sealing body $56_a$ closes the vent cross-section or gap 74 which goes into the air discharge passage $60_a$ which here is in the form of a hollow profile of an outside diameter e, while in the opened position of the device $10_a$, it rests with an external bead or ridge 76 at its end—as shown in FIG. 4—on an internal collar 78 of a hollow head profile member 61 of larger outside diameter $e_1$, which projects downwardly from the top wall 38. By virtue of that configuration, the vent cross-section 74, in the opened position of the device $10_a$ in which the bulk material flows into the lock space 24, on the one hand is kept open, while on the other hand the closure body $64_a$ is freely movable until, in its closing travel in the direction y, it reaches the peripherally extending annular seat 63 acting as a sealing edge, and thus closes off the lock space 24 towards the intake housing 34.

Arranged at the outer periphery of the closure body $64_a$ are inclined guide surfaces which, by means of projections $58_a$ protruding from the round bars 48, rotate the closure body $64_a$ stepwise about the longitudinal axis A of the housing, in the axial vertical movement of the closure body $64_a$. That results in the elimination of partial leakages which can occur for example due to the formation of grooves or furrows at the sealing edge 70. That is particularly advantageous when, when dealing with hot bulk material, the sealing edges 70 must comprise tough, heat-resistant material.

In this case, the blowing device 32 for producing the air curtain which is directed towards the closure body $64_a$ is in the form of an annular nozzle with tangential air in-feed through the connection $33_a$. The conveyor line 12 with the annular gap nozzle 15 can be uncoupled from the lock space 24 by means of an outlet valve 82 in the connecting bend $18_a$. Diagrammatically shown in the lock space 24 at 80 is a porous cone with an air connection 81, by which the discharge of material being conveyed out of the lock space 24 is assisted.

The discharge valve 82 is for example provided with a conical closure head 84 having a plunger piston $54_a$. The seat 86 of the discharge valve 82 is blown free of product in the closing operation by means of an air curtain, by means of an annular gap nozzle 88 with a tangential flow thereto. Other types of valves—for example slider members or flaps—can also be used as the discharge valve.

The closure head 84 is moved alternately in relation to the closure body $64_a$. In that way, it is possible to maintain the conveyor operation in the conveyor line 12 when the lock space 24 is in the pressure-less condition, when the feed of compressed air still occurs through the annular gap nozzle 15 of the flange portion 14.

A particularly advantageous embodiment of the sealing system between the intake housing 34, the lock space 24 and the closure body 64—like also $64_a$—and the functioning thereof is shown in FIG. 5, in two half-sections. The left-hand half in FIG. 5 shows the lower position of the closure body 64 on its closing travel y at a seal or sealing lip 90 with a lip edge 91 which here is parallel to the axis, the seal or sealing lip being gripped in a pair of flanges 89 of the lock housing 22 and the intake housing 34, inclined at an angle of inclination w of about 40°. The right-hand half of FIG. 5 shows the upper position of the closure body 64, providing for sealing closure between the intake housing 34 and the lock space 24.

That sealing system comprises the closure body 64 with an air discharge passage 60 which extends upwardly therefrom, the stroke element 52 and the resilient seal 90. The closure body 64 which enlarges downwardly in a funnel-like configuration has an edge portion 95 which is curved inwardly in respect of its cross-section—at a sealing edge 94—and from which pin-like entrainment portions 92 project radially. The spacing z thereof from the sealing edge 94 is shorter than the thickness t of the seal 90. In the stroke movement of that closure body 64 of a maximum outside diameter n, the entrainment portions 92 engage under the seal 90 in such a way that the edge region thereof is entrained upwardly and the inside diameter q thereof is reduced; the lip edge 91 of the seal 90 bears snugly against the peripherally extending sealing edge 94, as is shown in a somewhat exaggerated form in FIG. 5 for the sake of enhanced clarity. Tests have shown that it is sufficient if the sealing edge 94 penetrates into the seal 90 by only fractions of a millimeter.

The deformation characteristics of the seal can be determined in the optimum fashion by virtue of the configuration of the seal 90 and/or reinforcement thereof.

The system also makes it possible for the deformable seal 90 to be in the form of part of the closure body 64—this is not shown—; it moves into a fixed opening and is there deformed in such a way that its outside diameter is increased and thus produces a sealing closure effect in the opening.

In a particularly advantageous manner of air feed-in control for the lock device 10, $10_a$, as shown in FIG. 6, compressed air flows from a compressed air source 96 through a line 97 to a comparator 98. A feed line 100 also opens thereinto, the feed line 100 being acted upon by the actual conveyor pressure of the lock device 10, $10_a$ (not shown in FIG. 6), with a conveyor pressure which is predetermined at a reference value generator 102 through a feed line $100_a$.

Compressed air lines 104 and $104_a$ are connected to the outlet of the comparator 98; the compressed air line 104 goes to the connection 33 of the blowing device 32, possibly to the connection 81 of the porous cone 80 (FIG. 3). The compressed air outlet 104$_a$ is associated with the annular gap nozzle 15 of the flange portion 14 and can be taken to connections along the conveyor line 12. Both compressed air lines 104, 104$_a$ are connected together in quantitatively limited relationship by a throttle section 106.

The comparator 98 switches the outgoing compressed air lines 104, 104$_a$ alternately in such a way that—if the actual conveyor pressure at the feed line 100 is equal to or greater than the pressure which is predetermined by the reference value generator 102—the compressed air which is being supplied through the line 97 is fed to the outgoing compressed air line 104$_a$. If the actual conveyor pressure at the feed line 100 is less than the reference conveyor pressure at the feed line 100, the compressed air is switched to the outgoing compressed air line 104.

The comparator 98 can directly process pneumatic signals or electrical signals if the signal supplied through the feed line 100 is converted into an electrical signal and the reference value signal is predetermined electrically.

What is claimed is:

1. A device adapted for transferring bulk material from a holding space through a lock space into a pneumatic conveyor line, wherein the lock space is closable in relation to the holding space by an axially movable closure body and at least one counterpart sealing element in opposite relationship thereto in its path of movement, characterised in that the closure body has at least one vent opening which opens into an air discharge passage and is closable in the upward closing movement of a stroke element and a sealing body, wherein the downward opening travel (x) of the sealing body against the closing movement is shorter than the downward travel of the stroke element with the sealing body.

2. A device as set forth in claim 1 characterised in that the closure body (64, 64$_a$) is enlarged from a narrow cross-section forming an inner sealing edge (63) towards the sealing body (56, 56$_a$) in a funnel-like configuration and the narrow cross-section is the annular seat for the sealing body in the closure position.

3. A device as set forth in claim 1 characterised in that an air discharge passage (60; 60$_a$, 61) goes from the vent opening (62) of the closure body (64, 64$_a$) to an aperture (40) in an intake housing (34) arranged upstream of the lock space (24) and the air discharge passage can be connected at the aperture to a discharge air line.

4. A device as set forth in claim 1 characterised in that the sealing body (56, 56$_a$) is provided with a cone tip (57) for the annular seat (63).

5. A device as set forth in claim 1 characterised in that in the region of its vent opening (62) the closure body (64, 64$_a$) is connected to an air guide element (60; 60$_a$, 61) which is variable in length, as an air discharge passage.

6. A device as set forth in claim 5 characterised by a bellows member (60) as the air guide element.

7. A device as set forth in claim 1 characterised in that disposed in opposite relationship to the lower edge (66) of the funnel configuration of the closure body (64, 64$_a$) are abutment elements (58, 58$_a$) provided in the lock space (24).

8. A device as set forth in claim 3 comprising a reduced pressure source (41) at the air discharge passage (60; 60$_a$, 61), at which an injector (41) is arranged.

9. A device as set forth in claim 1 characterised in that the closure body (64, 64$_a$) which is movable in the lock space (24) is surrounded by a substantially stationary sealing edge (70, 91) as a counterpart sealing member.

10. A device as set forth in claim 9 characterised in that a blowing device (32) for producing an air curtain is associated with the sealing edge (70, 91) and the closure body (64, 64$_a$).

11. A device as set forth in claim 10 characterised in that the blowing device (32) is in the form of an annular gap nozzle with a tangential air feed (33).

12. A device as set forth in claim 10 characterised in that the sealing edge and the blowing device are arranged in the transitional region between the intake housing and the lock space.

13. A device as set forth in claim 11 characterised in that the blowing device (32) with its air feed (33) forms a separate annular insert between the intake housing (34) and the lock housing (22).

14. A device as set forth in claim 1 characterised in that a conveyor air partial flow introduction means (15, 16) is arranged downstream of the lock space (24) at its outlet.

15. A device as set forth in claim 1 characterised in that the stroke drive for the sealing body (56) comprises a bellows-type cylinder (52).

16. A device as set forth in claim 15 characterised in that the bellows-type cylinder (52) is arranged on a carrier plate (50) in the lock space (24).

17. A device as set forth in claim 1 characterised in that connected to a compressed air source (96) is a comparator (98) to which there are connected a feed line (100) for conveying the actual conveyor pressure of the lock device (10, 10$_a$) and a feed line (100$_a$) from a reference value generator (102).

18. A method of transferring bulk material from a reservoir or a holding space through a lock space into a pneumatic conveyor conduit by means of a device
adapted for transferring bulk material from a holding space through a lock space into a pneumatic conveyor line, wherein the lock space is closable in relation to the holding space by an axially movable closure body and at least one counterpart sealing element in opposite relationship thereto in its path of movement, characterised in that the closure body has at least one vent opening which opens into an air discharge passage and is closable in the upward closing movement of a stroke element and a sealing body, wherein the downward opening travel (x) of the sealing body against the closing movement is shorter than the downward travel of the stroke element with the sealing body characterised in that air displaced from the lock space during the introduction of the bulk material is discharged through at least one vent opening in the closure body which goes into an air discharge passage.

19. A method as set forth in claim 18 characterised in that the displaced air is sucked out of the lock space (24).

20. A method as set forth in claim 18 characterised in that the conveyor air is fed to the device at at least two feed-in locations and said feed-in locations are controlled alternately in dependence on a predetermined reference value of the conveyor pressure and an instantaneous actual value of the conveyor pressure, wherein air in-feeds into the conveyor line connected downstream of the device are possibly coupled to the conveyor air in-feed connected downstream of the lock space.

21. A device as set forth in claim 15 characterized in that the pneumatic cylinder is arranged on a carrier plate in the lock space.

* * * * *